(12) United States Patent
Sarat

(10) Patent No.: US 6,181,735 B1
(45) Date of Patent: Jan. 30, 2001

(54) MODEM EQUIPPED WITH A SMARTCARD READER

(75) Inventor: Jean-Marc Sarat, Nans les Pins (FR)

(73) Assignee: Gemplus S.C.A., Gemenos (FR)

( * ) Notice: Under 35 U.S.C. 154(b), the term of this patent shall be extended for 0 days.

(21) Appl. No.: 08/849,640

(22) PCT Filed: Sep. 24, 1996

(86) PCT No.: PCT/FR96/01497

§ 371 Date: Aug. 13, 1997

§ 102(e) Date: Aug. 13, 1997

(87) PCT Pub. No.: WO97/12478

PCT Pub. Date: Apr. 3, 1997

(30) Foreign Application Priority Data

Sep. 25, 1995 (FR) .................................................. 95 11214

(51) Int. Cl.$^7$ .................................................. H04B 1/38
(52) U.S. Cl. .................................................. 375/222; 380/266
(58) Field of Search .................................................. 375/219, 220, 375/222; 380/9, 25, 49, 266; 463/45; 713/155, 159, 172, 192, 200; 705/44

(56) References Cited

U.S. PATENT DOCUMENTS 5,164,985 * 11/1992 Nysen et al. ............................. 380/9
5,546,463 * 8/1996 Caputo et al. .......................... 380/25
5,624,316 * 4/1997 Roskowski et al. .................... 463/45
5,778,071 * 7/1998 Caputo et al. .......................... 380/25
5,835,603 * 11/1998 Coutts et al. ........................... 380/49

OTHER PUBLICATIONS

Daniel Sternglass, "The future is in the PC cards," IEEE Spectrum, pp. 46–50, Jun. 1992.*

* cited by examiner

Primary Examiner—Stephen Chin
Assistant Examiner—Chieh M. Fan
(74) Attorney, Agent, or Firm—Roland Plottel

(57) ABSTRACT

The invention relates to modems designed to allow transmission of data between a terminal (a personal computer or PC) and a network. To improve the operating versatility of a modem or its utilization by a smartcard, the modem is equipped according to the invention with a receptacle (80) for receiving a smartcard (120), with a connector (110) for this card and a card interface circuit (100), and the microcontroller (50) of the modem (the microcontroller controlling communication with the network when commanded by the PC) also controls the card interface circuit. This microcontroller thus constitutes the kernel of the modem and at the same time the kernel of a card reader. The communication with the card is effected by commands known as 'AT' and the systematic prefix sequence 'AT' (whereby the microcontroller recognizes that it has to carry out an operation) is followed by a second systematic prefix sequence if a communication operation between the terminal and the card is to be effected. The second prefix sequence is '+G'.

5 Claims, 2 Drawing Sheets

MODEM EQUIPPED WITH A SMARTCARD READER

BACKGROUND OF THE INVENTION

1. Field of the Invention

The invention relates to modems, namely devices that modulate and demodulate electrical signals for transmitting or receiving data (mainly digital data) between a terminal and a communications network. The network connects at least two terminals and a modem is placed between each terminal and the network.

2. Description of the Related Art

The terminal is usually a personal computer and the communications network is a telephone transmission network. In this case, the modem is a peripheral of the personal computer and can be connected between a communications port on the computer (generally a serial communications port) and the telephone network. The signal transmission protocol is such that the telephone network, originally designed to transmit analog signals representing speech, can transmit coded signals representing digital data either in the "character" mode (transmission of octets representing characters) or in "fax" mode (transmission of images as dots).

The invention will accordingly be described in the most current application which is the case of a personal computer (hereafter called PC) connected by the modem to a telephone network.

The modem has two main functions: modulating electrical signals to convert binary data into signals compatible with the telephone transmission network according to a well-defined protocol that allows these signals to be interpreted at the other end of the network; and demodulating signals from the network to convert them into binary data that can be processed by the PC to which the modem is connected.

Physically, the modem is comprised
of a line interface circuit for providing and receiving signals in the protocol corresponding to the transmission network,
a PC interface circuit to provide and receive signals according to the PC protocol,
a modulation/demodulation circuit, sometimes called data pump, to convert the data signals of the PC protocol to the network protocol upon emission of the signals and make the reverse conversion upon reception,
a microcontroller (i.e. a microprocessor with its memories, particularly with a read only memory) to control the communication, particularly to control the action of the other circuits of the modem,
and fixed programs containing instructions, contained in the microcontroller memories.

The microcontroller executes programs contained in its read only memory (fixed programs or subprograms, generally directly executable). It executes these programs according to commands it receives from the terminal through the communications port connecting the terminal to the modem. These commands can be in high-level language and input directly at the terminal's keyboard and transmitted in ASCII format to the microcontroller. The executable instructions include all the elements necessary for commanding circuits that convert the signals in the two directions (from the PC to the network and from the network to the PC) and other elements allowing other functions of the modem (data compression, error correction, transition to fax mode or alphanumeric mode, etc.) to be commanded.

At the present time, a great many modems are built so that they can be controlled by a set of commands called the "AT command set" or Hayes commands. These commands allow the various functions of the modem to be controlled in plain language from the terminal.

The principle of AT commands is the following: if the modem's microcontroller receives a command in ASCII code starting with the letters "A" and "T" and which ends with the ASCII code corresponding to a carriage return on a keyboard, then the microcontroller considers it a modem command and executes the command requested; the command requested is defined by an ASCII character sequence introduced after the prefix sequence 'AT and before the carriage return. The command is a command corresponding to one of the communication functions (or communication-linked functions) between the PC and the network. The command may be sufficient by itself or require parameters and/or data to be executed. If there are parameters and/or data, these parameters or data follow the command before the carriage return code.

For example, the command can be a telephone dialing command to call a party: the name of the command in plain language is 'DP' (for "Dial Pulse"); the letters DP are sent to the modem microcontroller and are followed by the telephone number requested, and a separator can be placed between the command and the number. The 'DP' command is hence always followed by a datum. Thus, to call the number 40 67 11 99 from a PC keyboard, a user keys in the following sequence: ATDP40671199 and ends the command by pressing the carriage return key. The modem microcontroller then commands all the operations for the modem to send the dial pulse signal over the line to the party called by this number. The command would be DT (for "Dial Tone") if the dial signal sent over the line were not made up of series of as many pulses as numbers dialed but of different frequencies or tones party to the numbers called.

Another example of a command is "A." This is the response to an incoming call: the modem is called by a party; if one wishes it to respond, namely to enter into communication with this party on the network, one must send the microcontroller the sequence 'ATA' then the carriage return ending the command.

Another example, instead of a single command, is a macrocommand defining a group of possible commands; this is the macrocommand "+F" which must be followed by the command precisely chosen from the group. The macrocommand "+F" indicates that the call to the network must be in "fax" mode and not in "character" mode. This macrocommand is hence followed by another command corresponding to a requested function, itself followed if applicable by parameters or data necessary for executing the command.

All these commands and macrocommands are hence recognized by the modem microcontroller if they start with the sequence 'at' and they then trigger execution by the modem of communication functions between the network and the PC.

It has also been proposed that communications units (telephone, personal computers, communications terminals using modems) be controlled with smartcards, particularly to provide a security function protecting these units from access by unauthorized persons. This smartcard use control consists simply of adding an additional peripheral to the computer, namely a smartcard reader, or consists of adding such a peripheral to a specialized communications terminal other than a computer (e.g. a modem+keyboard+screen assembly known as "minitel"). Usually this smartcard reader is used only to block or authorize utilization of the terminal, and this blockage or authorization is established either directly by inserting a smartcard or, after a dialog between the terminal and the card, entering secret codes or other security protocols. The options offered today by this combination of a terminal and a smartcard are limited, as the card reader is in practice an independent reader adjacent to the terminal to authorize it to operate.

BRIEF SUMMARY OF THE INVENTION

The goals of the invention are: significantly increasing the functions conferred on a communications system by the presence of a smartcard; reducing the manufacturing costs of this enhancement; and, for the user, facilitating simultaneous mastery of communication with the modem and utilization of a smartcard in the context of this communication.

According to the invention, it is proposed that the microcontroller of a modem, which microcontroller provides the main functions of controlling communication between a PC and a network and which responds to commands from the PC, has programs providing these main communication control functions and programs controlling a circuit that interfaces with a smartcard.

Thus, the modem microcontroller also constitutes the kernel of a smartcard reader; the commands from the PC for controlling the modem allow the microcontroller to function as a card reader for operations that involve a card, or allow the microcontroller to function as a device controlling communication with the network.

According to a more detailed structural definition, the present invention provides a modem for data communication between a terminal and a data transmission network, said modem having a microcontroller with internal programs for managing this communication, these programs being activated when the terminal sends predetermined commands to the microcontroller, characterized in that the modem also has a receptacle for receiving a removable smartcard, a connector in this receptacle for establishing electrical links with contacts on the card, and a card interface circuit connected between the microcontroller and the connector to allow communication between the card and the microcontroller through the connector and the card interface circuit, said card interface circuit being controlled by the modem microcontroller and the microcontroller having other internal programs allowing communication between the terminal and the card to be managed under the control of other commands emitted by the terminal.

Hence the modem has the mechanical elements necessary for inserting a card, holding it in place, and an electrical connection with specialized contacts; said specialized contacts are connected by an interface circuit between the card and the microcontroller.

In addition, the programs coming from the PC have modem-type operating commands and card reader-type operating commands. However, since it is the same microcontroller that receives these two types of command, the invention provides that the commands that trigger card reader-type operation use the same language as those that command communication by the modem with the network; it is provided in particular:

that all these commands begin with the same prefix sequence recognized by the microcontroller as defining a command intended for the modem, whereby the microcontroller has means for recognizing the arrival of this prefix sequence and executing a command following this prefix sequence;

and that all the commands for communication with the card continue with a second prefix sequence immediately following the first and followed by a command proper, whereby the microcontroller has means for recognizing this second prefix sequence and then executing said command which is a communication command between the terminal and the card.

In the standard example of modems operating with AT commands, the first prefix sequence is the command 'AT'; the second prefix sequence can be the command '+G'. Hence, all the communication instructions with the card begin with the specific sequence 'AT+G'.

In the entire following description, sequences representing commands are written in alphanumeric characters (letters, numbers, and other classical ASCII symbols) and placed between quote marks. They actually correspond to what the user has to type on the keyboard if the commands are input by keyboard. The electrical signals corresponding to them and sent to the microcontroller are the binary strings corresponding to the ASCII transcription of these alphanumeric characters and symbols.

The instructions intended specifically for communication with the card are executed by the microcontroller as soon as it receives them and recognizes the command 'AT+G' that prefixes these instructions.

The card can be used to provide an operating authorization to the PC or the modem, but also to ensure authentication of a party from a control authority connected to the network: for example, if access to a database connected to the network is controlled by a server, the latter can ask authentication questions in which the card plays a key role. This is also the case for validating remote transactions with the card.

Other characteristics and advantages of the invention will emerge from reading the detailed description that follows, which refers to the attached drawings wherein:

DETAILED DESCRIPTION OF THE INVENTION

Figure 1:
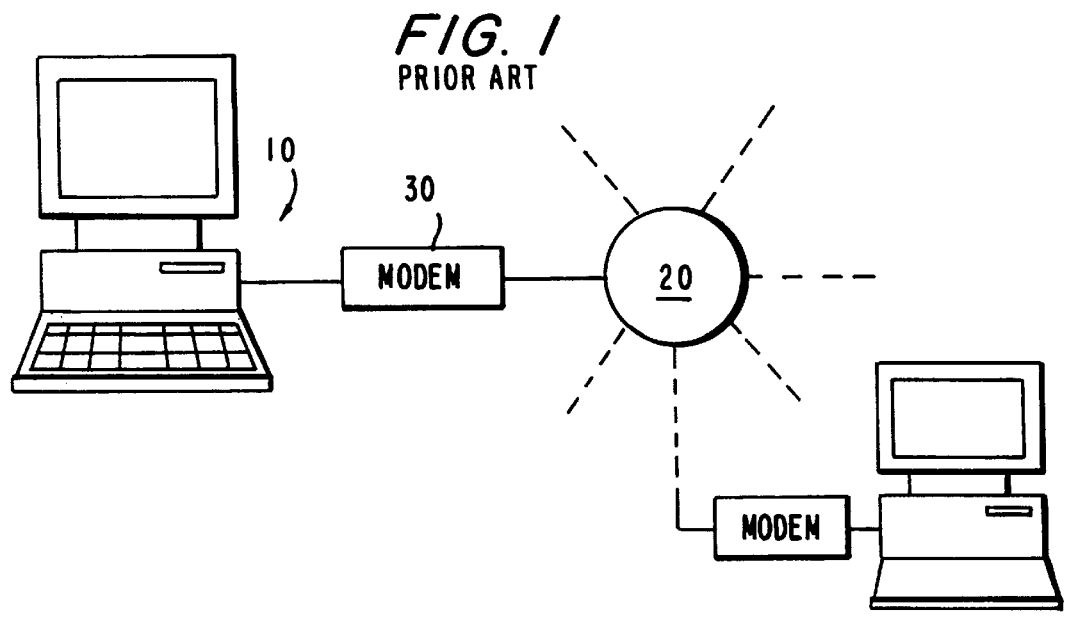
FIG. 1 represents a classical PC configuration connected to a network by a modem.

FIG. 1 represents a terminal 10, which is preferably a personal computer (PC) with its keyboard and screen, connected to a communications network 20 which can simply be the telephone network. A modem 30 is classically interposed between the PC and the network to ensure that the data to be transmitted from the PC to the network conform to a standard acceptable to this network. Other terminals are disposed at other input-output points of the network and a modem is interposed between each terminal and the network. A communication can thus be established between two PCs.

The modem can be built into the PC; it is generally then a specialized peripheral card in the PC; or it can be in a housing separate from the computer, connected to a serial communications port of the PC.

The various functions of the modem are established by a microcontroller which constitutes the intelligent kernel of the modem. This microcontroller has a microprocessor (capable of receiving and executing sets of instructions) and memories, particularly at least one read only memory which contains programs or subprograms for the microprocessor. The various programs correspond to the various outgoing or incoming communication functions that the modem may have: communication establishing routines (calling, dialing, auto answer, etc.), error correction, redundancy, and data compression procedures, operating in fax mode, etc.

These programs and subprograms in the microcontroller memories are what are called the firmware of the modem, namely the fixed software physically built into the equipment.

These integrated programs are activated by a command from the PC. For this purpose the latter provides the microcontroller with commands (in the computer processing sense of the term), namely orders to run executable subprograms, and these commands can either be entered directly from the PC keyboard by the user or furnished by the memories of the PC. The microcontroller interprets these commands, usually received in ASCII format, and executes them by running the appropriate program or programs.

In practice, almost all modems operate with commands known as AT commands or Hayes commands. Each command has a sequence of several keyboard characters and all the sequences begin with the string of two consecutive characters, namely of the character 'A' followed by the character 'T'. The command ends with the character representing the "carriage return" or "enter" on a classical keyboard. As soon as the modem microcontroller receives the 'AT' sequence, it knows that the command is intended for it, registers it, and waits for the end (carriage return) to execute it.

As previously explained, if the 'AT' sequence is followed by the '+F' sequence, the microcontroller knows that it must configure the modem in "fax" mode and the programs it will execute will correspond to a fax transmission protocol. Certain modems do not have this "fax" mode.

Figure 2:
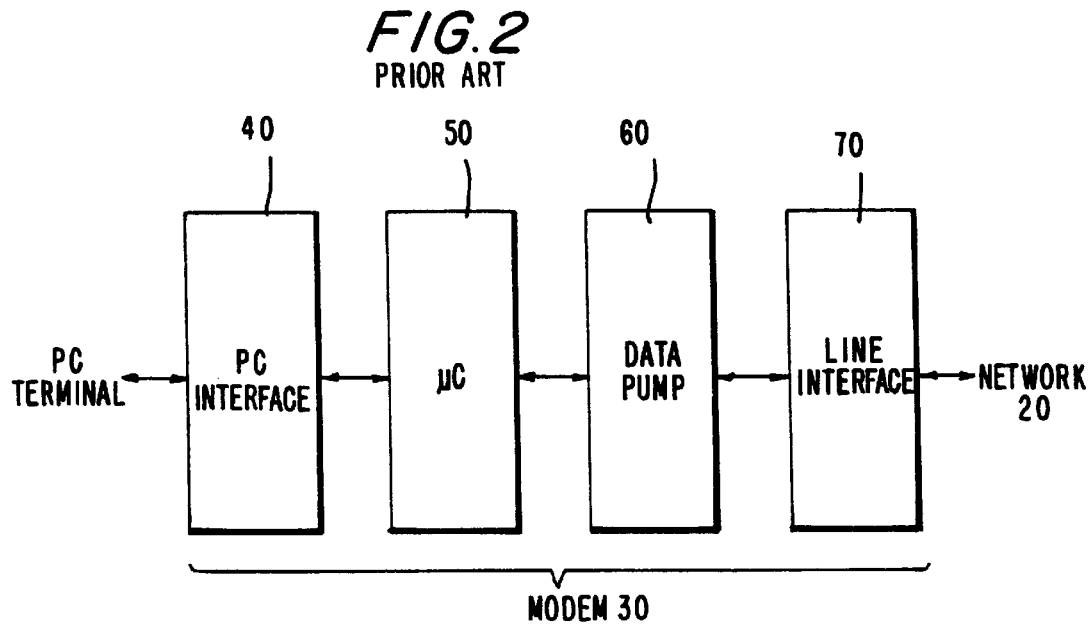
FIG. 2 represents the general structure of the modem.

FIG. 2 shows the classical schematic configuration of a modem with a PC communications interface circuit 40 (generally a serial communications interface circuit), a microcontroller 50, a specialized signal processor 60 constituting the data pump, namely the modulation/demodulation circuit proper controlled by the microcontroller, and a line interface circuit 70 (serial communications interface) connected to the network.

Figure 3:
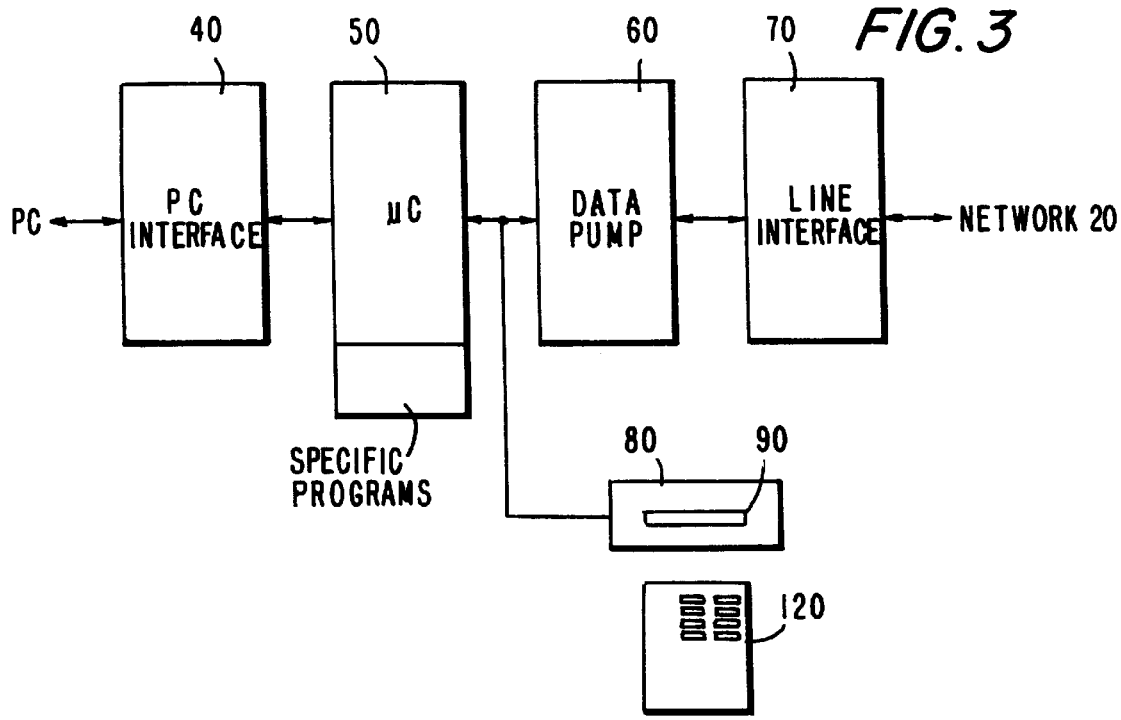
FIG. 3 represents the structure of the modem modified according to the invention.

FIG. 3 shows schematically the configuration of a modem according to the invention.

The modem has the same elements as in FIG. 2, and also physical elements proper for constituting a smartcard reader, but the kernel of this reader is not a specific microcontroller programmed as a card reader, but is microcontroller 50 of the modem which has built-in software (firmware) appropriate for communication between the card and the PC. The additional elements added relative to FIG. 2 are, in addition to specific supplementary programs of the microcontroller firmware, a receptacle 80 for receiving a card with an insertion slot 90, a connector in this slot, and a card interface circuit controllable by the microcontroller.

Figure 4:
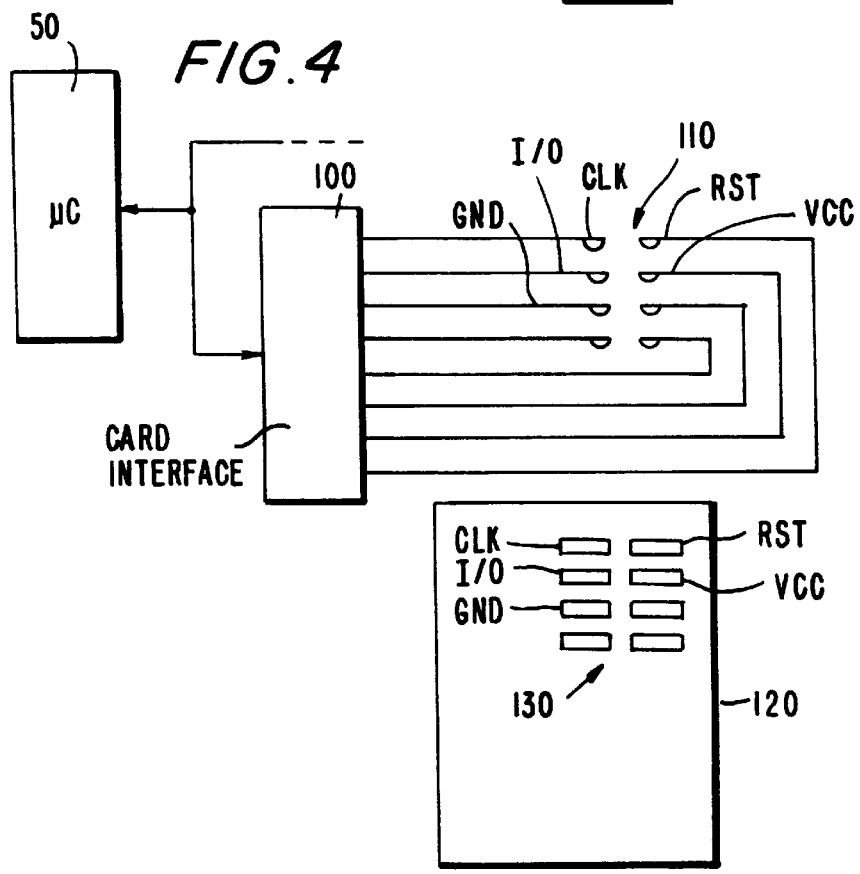
FIG. 4 shows a detail of FIG. 3.

FIG. 4 shows schematically card interface 100, connector 110, and card 120 with contacts 130 that can be opposite connector 110 when the card is inserted into its receptacle.

To facilitate the use of the smartcard in association with the modem, it is provided not only that the same microprocessor form the kernel of the modem and the kernel of the card reader, but it is also provided that the commands from the PC for communication with the card form a subset of the modem commands. In other words, in the typical case where the modem commands necessarily begin with the sequence 'AT', it is provided that the communication commands with the card also necessarily begin with the sequence 'AT'.

In order for the microcontroller to determine that this is a communication command with the card, it is preferably arranged that any card communication command begin with the sequence 'AT+G' and end with an ASCII character corresponding to the carriage return. The rest of the sequence, before the carriage return, precisely defines the commend requested.

It will hence be understood that the modem of the invention is provided with internal programs such that:

its microcontroller reacts to a two-character sequence 'AT' by considering the next sequence as a command;

the same microcontroller reacts to a four-character sequence 'AT+G' by considering the next sequence up to the next carriage return character as a card communication command.

The card communication commands can be various.

The general principles adopted for card communication commands are preferably the following (other than the general principle of beginning any sequence with the sequence 'AT+G' and the general principle of ending with a carriage return character):

the commands are accepted in upper case or in lower case; the microcontroller thus interprets an ASCII character corresponding to a lower-case alphabetical character and the ASCII character corresponding to the same alphabetical character in upper case, identically;

the 'AT+G' sequence is however of a single type;

interpretation of the command does not begin until after the carriage return;

the card commands cannot be chained: a command is not accepted until the previous command has been fully executed and until any response has been transmitted; on the contrary, operating commands from the modem for communication with the network can be chained;

the number of characters contained in one command line cannot exceed 256;

The command proper can be accompanied by mandatory or optional parameters allowing it to be executed;

the equals sign '=' is a separator indicating the presence of parameters associated with the command; it is placed after the command proper; if there are several parameters, they are separated by a comma (','); a parameter can be constituted by one or more octets without a separator;

the command octets received by the microcontroller are expressed in hexadecimal and each is constituted by two ASCII characters; they can be input from the PC keyboard and transmitted as such to the microcontroller.

The card communication commands normally evoke responses. The format of the responses sent by the modem to the terminal in the case of a communication with the smartcard is the following:

the card responses are of a single type (extended) and cannot be suppressed;

each response begins and ends with a carriage return followed by the sequence 'lf';

a response can be constituted by one or more parameters separated by a comma an 'ERROR' response is sent if the command has a syntax error or if one or more parameters are wrong.

Set of Commands

Several main commands that can be used to operate the modem according to the invention for its communication function with a smartcard will now be provided, and the associated responses will also be given. Commands between the PC and the network are classical Hayes commands.

1. Turn On and Reset

To turn on a card and reset (reinitialize) it, the 'AT+GON' command is sent; it is followed by a parameter T1 (value between 0 and 255) defining the card insertion waiting time. The command is 'AT+GON=T1'.

The response sent by the modem microcontroller to the terminal is composed of the sequence 'TS' followed by at most 32 characters. These characters can be the following parameters: TO (format character), TAi, TBi, TCi, TDi (interface character), T1, T2 . . . Tk (history characters), TCK (control character).

2. Card Hot Reset

Hot reset (without turning off) is controlled by the sequence 'AT+GWR'.

The response is the same as for turning on.

3. Sending Dialog Command

Without going into details of the communication protocols between a card reader and a card, it will be recalled that the ISO7816 standards call for dialog commands between the reader and the card; these commands are grouped under the designator APDU. By analogy, a command prefix 'AT+GPDU' is created here and this, when sent by the terminal to the modem microcontroller, indicates that an APDU type command is to be sent to the card. The command sent will obey the following rules after the prefix sequence 'AT+GPDU' and before the carriage return:

the command includes a header and a body;
the header includes successive values CLA, INS, P1, P2, each represented by an octet (two ASCII characters); each value is between 0 and 255; CLA is the instruction class; INS is the instruction code, and P1 and P2 are parameters;
the body of the instruction has three fields: Lc, Data, and Le. The Lc field contains the number of words present in the data field; Data is the data field proper to be transmitted; "le" is the number of words expected in the response.

For example, the instruction:

'AT+GPDU=OX,DA,02,A0,2,6D,6C,0,0' is a write request (data accept instruction DA) to address 02A0 of a field of two (2) octets including the characters 6D and 6C.

The response is composed of an optional body which is a data field representing a number of words received, and a mandatory ending including two octets SW1, SW2 called "command processing status" and "command processing qualifier"; these two octets represent the fact that the command is correct and there is no error in the data.

Other than a write request (DA), other commands of the APDU type are possible, for example a read request for a zone of the card, a signature calculation request by the card, etc.

4. Identification

The command is an inquiry about the type of card inserted. The command is 'AT+GI'. It is not followed by parameters.

The response is a group of two octets R1, R2 representing the type of coupler and the type of card respectively.

5. Turning Off

Turning off is done by 'AT+GOFF' command without a parameter. The response is the octet R1 defining the type of coupler.

6. Configuration

The card register configuration can be commanded by the terminal. The command is 'AT+GSR' followed by the parameters S1, S2, S3 which define the registers to be activated ("set register" command). The response is a string of octets confirming this activation.

This defines the principal commands that can be sent by the terminal for the modem microcontroller and which are understood as instructions for communication with a smartcard inserted into the insertion slot associated with the modem.

Card interface circuit 100 which is controlled by the microcontroller upon reception of these commands is constituted in classical fashion (namely like a classical card reader) such as to establish signals according to a classical communication protocol between a card and its reader. Reference may be made to ISO 7816 for the format of these signals and hence for constituting the interface circuit. The card connector generally has 6 or 8 contacts including at least the following contacts: CLK (clock), I/O data, RST (reset), VCC (power supply), and GND (ground). These contacts are shown in FIG. 4.

In one application to local modem utilization security, it is the PC that manages this security, access to the modem being authorized if the PC has ascertained that a smartcard has been introduced into the modem and the secret code corresponding to this card has been keyed in by the user.

In this case, the procedure may be as follows: the PC security program asks the user to insert a card into the modem and for example sends an instruction of the 'AT+GON' type to the modem microcontroller; when the card is present, it sends a response (in a communication protocol between reader and card) and this response is sent by the microcontroller to the PC (in the PC protocol; the PC asks the user to enter his secret code using the keyboard; it sends this code to the card by an instruction beginning with 'AT+G'; the card verifies this code and sends an accept or refuse response; the modem microcontroller sends this acceptance or refusal and the PC authorizes or fails to authorize its "modem" peripheral for the network communication functions depending on acceptance or refusal.

In another application, the card is used to authorize access or transactions with a party on the network. This is not a local mode security application but a remote mode security application.

For example, the PC is used to access an on-line database managed by a server, with the access being authorized if the user is indeed an authorized subscriber, provided for this purpose with a smartcard and a secret code which he alone possesses. The card is then preferably a card with response calculation algorithms involving at least one secret key contained in the card.

The PC establishes the link with the network by 'AT' commands sent to the modem (but not 'AT+G' commands). The database server starts a control procedure consisting of asking the PC to furnish a response to a random datum. The correct response can be sent only if the PC user uses simultaneously the random datum, a secret key contained in the card, and a secret code possessed by the user. The correct response can be calculated by the server which knows its subscribers and thus knows the secret keys, the secret codes, and the random data they send. A comparison of responses by the server will authorize access to the database.

In this case, after the PC has received a random datum from the server, it starts a dialog with the card by commands of the 'AT+G' type; the PC sends the random datum to the modem microcontroller; the latter sends it to the card in the card communication protocol; it does the same for a secret code that the PC asks the user to enter; the card calculates a response, sends it to the modem microcontroller, which transmits it in its turn to the PC; then the PC sends it to the network by an 'AT' type command not followed by the prefix '+G'. The server then checks the accuracy of the response and authorizes access to the database or refuses such access.

The procedure would be similar for making a transaction validated by the fact that an accurate response is furnished by the card in response to a random datum.

Since it is the same microprocessor that controls the communication with the network and the communication with the card, it may be that the microcontroller responds directly to a specific command from the network (not from the PC) to transmit the random datum directly to the card, or perform other communication operations with the card without going via the PC. For example, if procedures using the card do not require entering a secret code via the keyboard, such operations may be performed directly, facilitated by the fact that it is the same microcontroller that controls both the modem and the card.

A novel modem design has been described, offering more options than in the prior art, which is less expensive, and more practical for the user since the communication syntax can be essentially the same for the modem and for the card.

Among possible applications, one may cite:

remote payment by bank card; remote sale;

secure access to in-house networks from outside networks such as the internet;

card-controlled banking at home; bill paying; purchase and sale of securities;

electronic purse;

secure automatic connection to databases or to software help servers providing software upgrades, remote troubleshooting, etc.

What is claimed is:

1. Modem for data communication between a terminal (10) and a data transmission network (20), said modem having a microcontroller (50) with internal programs for managing this communication, these programs being activated when the terminal sends predetermined commands to the microcontroller, characterized in that the modem also has a card interface circuit (100) to allow communication between a removable integrated circuit card and the microcontroller, said card interface circuit being controlled by the modem microcontroller and the microcontroller having other internal programs allowing communication between the terminal and the card to be managed under the control of other commands emitted by the terminal.

2. Modem according to claim 1, characterized in that all the commands intended for the modem microcontroller have a first predetermined prefix sequence ('AT'), said microcontroller having means for recognizing the arrival of this sequence and executing a command following this prefix sequence.

3. Modem according to claim 2, characterized in that all the communication commands between the terminal and the card have a second predetermined prefix sequence ('+G') immediately following the first prefix sequence ('AT'), said microcontroller having means for recognizing the arrival of this second sequence and executing a command according to these two sequences.

4. Modem according to claim 2, characterized in that the first prefix sequence is 'AT" and a second prefix sequence is '+G".

5. A modem according to claim 1 further comprising a receptacle (80) for receiving the removable integrated circuit card (120), with a connector (110) in this receptacle for establishing electrical links with contacts on the card, and said card interface circuit connected between the microcontroller and the connector establishes communication between the card and the microcontroller through the connector (110) and the card interface circuit (100).

\* \* \* \* \*